Dec. 30, 1952        W. C. WELZ        2,623,916

ELECTRICAL MEASURING SYSTEM

Filed June 24, 1948

INVENTOR.
WILBUR C. WELZ
BY
Campbell, Brumbaugh, Free & Graves
HIS ATTORNEYS.

Patented Dec. 30, 1952

2,623,916

UNITED STATES PATENT OFFICE 2,623,916

ELECTRICAL MEASURING SYSTEM

Wilbur C. Welz, Houston, Tex., assignor, by mesne assignments, to Schlumberger Well Surveying Corporation, Houston, Tex., a corporation of Delaware Application June 24, 1948, Serial No. 34,905

1 Claim. (Cl. 171—95)

The present invention relates to electrical measuring systems and more particularly, to systems for obtaining indications of two electrical values in combination as in the form of a sum or difference, for example.

In certain electrical applications, as in surface geophysical exploration, for example, it is required to determine not only the respective magnitudes of a plurality of electrical values, but also their sum or difference. Obviously, this can be done by computation from the measured magnitudes of the several electrical values. However, this is often not satisfactory since such computations are time consuming and laborious, whereas it is essential that the desired information be made available immediately in commercial operations.

The principal object of the invention, accordingly, is to provide a new and improved electrical measuring method and apparatus for measuring directly a combination of a plurality of electrical values such as their sum or difference, for example.

Another object of the invention is to provide a new and improved electrical measuring method and apparatus for measuring directly and simultaneously the sum and difference of two electrical values.

A further object of the invention is to provide a new and improved electrical measuring method and apparatus for measuring directly and simultaneously the respective magnitudes of two electrical values as well as a combination such as the sum or difference thereof, or both the sum and difference thereof.

Still another object of the invention is to provide a new and improved electrical measuring method and apparatus of the above character which permits the relative polarities of the electrical values to be determined if the polarity of the one having either the greatest or least magnitude is known.

A still further object of the invention is to provide a new and improved electrical measuring method and apparatus of the above character by virtue of which the electrical value having either the greatest or least magnitude can be readily determined if the relative polarities of the two electrical values are known.

These and other objects of the invention are attained by introducing the two electrical values to be measured into branches of two different meshes of a three-mesh network in which each mesh is connected to the other two by means of at least one electrical element common to each of two meshes, one of the branches of one mesh being conjugate to a branch of another mesh. Suitable indicating or recording means may be inserted in branches of the network where the currents are functions of the sum or difference, respectively, of the two electrical values, thus enabling indications to be obtained either singly or simultaneously of the sum and difference. In addition, other indicating means may be connected in the network to enable separate indications to be obtained of the magnitudes of each of the two electrical values.

Additional objects and advantages of the invention will be apparent from the following detailed description of several representative embodiments, taken in conjunction with the accompanying drawings, in which.

While the novel electrical measuring system of the invention may be applied to the measurement of alternating currents and to transients, it will be described herein, for the sake of simplicity, in terms of direct current components, using resistance elements.

Figure 1:
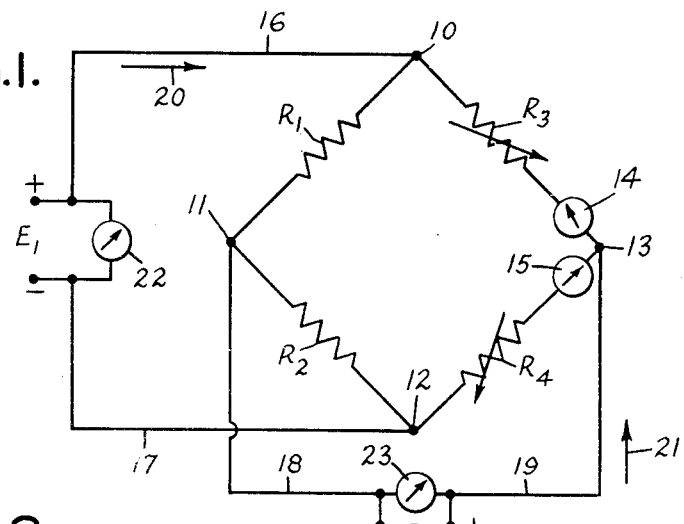
Fig. 1 is a schematic diagram of an electrical measuring system constructed according to the invention.

In the typical embodiment of the invention shown in Fig. 1, the electrical measuring system comprises a plurality of resistors R1, R2, R3 and R4 connected together to form a resistance bridge having the junctions 10, 11, 12 and 13. Interposed in two adjacent arms or branches of the bridge are indicating instruments 14 and 15 which may be of any suitable type, such as meters, recording galvanometers, oscillographs or electronic voltmeters. The junctions 10 and 12 of the bridge are adapted to receive an input signal E1 from any suitable source (not shown) through the conductors 16 and 17. Similarly, the junctions 11 and 13 are adapted to receive an input signal E2 from any suitable source (not shown) through the conductors 18 and 19.

For operation according to the invention, the bridge shown in Fig. 1 should be so designed that the branch comprising the conductors 16 and 17 and the branch comprising the conductors 18 and 19 are conjugate with respect to one another. In other words, the values chosen for the resistors R1, R2, R3 and R4 must be such that the signal E1 makes no contribution to the current flowing in the branch including the conductors 18 and 19, while the signal E2 makes no contribution to the current flowing in the branch comprising the conductors 16 and 17. It can be readily shown that the desired conjugate condition obtains in a bridge of this type when $R3R2=R4R1$. When the resistance values satisfy this equation, the input circuits generating the signals E1 and E2 will not interact with each other.

Obviously, the values for the resistances R1, R2, R3 and R4 required to produce the conjugate condition described above can be calculated in advance. Alternatively, the input branches of the bridge may be made conjugate by using variable resistors in the bridge and adjusting them in any known manner until the desired conjugate condition is obtained. This might be accomplished, for example, by connecting the conductors 16 and 17 to an indicating instrument in parallel with an electromotive force and connecting the conductors 18 and 19 to a similar indicating instrument and electromotive force. The resistors R3 and R4 are then adjusted until the interruption of either input branch does not affect the reading of the indicating instrument in the other branch.

If the directions of the currents corresponding to the signals E1 and E2 are as indicated by the arrows 20 and 21, respectively, in Fig. 1, the indicating instrument 14 will show a value proportional to the difference of the two input signals while the indicating instrument 15 will show a value proportional to the sum of the two signals. If desired, the indicating instruments may be calibrated to read the sum and difference of the two signals directly.

If the indicating instrument 14 is of the zero-center indicating type, it will indicate the polarities of the signals E1 and E2 provided that the relative magnitudes of those signals are known. The magnitude of each signal can be determined in any suitable manner as, for example, by means of the indicating instruments 22 and 23 connected to the conductors 16, 17 and 18, 19, respectively. Alternatively, if the polarities of the respective signals are known, then the signal of greater magnitude can be readily determined from the reading of the indicating instrument 14.

If the polarities of the signals are different from those indicated by the arrows 25 and 26 in Fig. 1, then appropriate changes in signs occur for the directions of the currents through the indicating instruments. For example, if the direction of the current from E2 is opposite to that given by the arrow 21, then the indicating instrument 14 will give a reading proportional to the sum of the voltage components of the two signals, while the indicating instrument 15 will give a reading proportional to the difference of the two signals.

Figure 2:
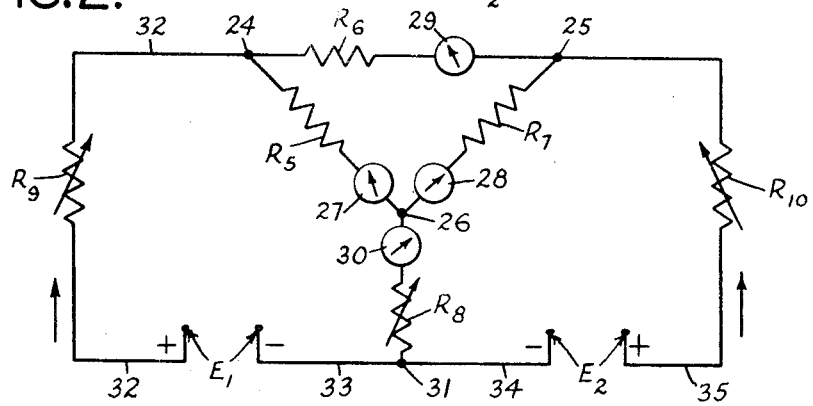
Fig. 2 illustrates schematically another form of electrical measuring system in accordance with the invention.

In the modification illustrated in Fig. 2 of the drawings, the measuring system comprises a plurality of delta-connected resistors R5, R6 and R7 forming the junctions 24, 25 and 26. Indicating instruments 27, 28 and 29 are connected in series with the three branches of the delta network, as shown. Also, the junction 26 is connected to a branch comprising a resistor R8 and an indicating instrument 30.

One input signal E1 is adapted to be received in a branch including a conductor 33 connected to the nework terminal 31 and a resistor R9 and a conductor 32 connected to the nework terminal 24. Similarly, a second input signal E2 is adapted to be introduced into another branch including a conductor 34 connected to the network terminal 31 and a conductor 35 and a resistor R10 connected to the network terminal 25.

For operation of the system shown in Fig. 2, according to the invention, the values of the several resistances must be suitably chosen so that, when the directions of the currents flowing in the conductors 32 and 35 are as indicated by the arrows, the indicating instrument 29 will give a reading proportional to the difference between the two signals, the indicating instrument 30 will give a reading proportional to their sum while the indicating instruments 27 and 28 will give readings proportional to the magnitudes of the respective signals. These conditions obtain for a number of different combinations of resistance values in the system.

In one convenient arrangement for the values of the resistors, the desired conditions obtain when $$R5=R7=aR8,$$
$$R9=R10, \text{ and}$$
$$R6=aR9$$

where $a$ is a number and each resistor represents the total resistance in the branch in which it is connected, including the resistance of any indicating instrument or source of E. M. F. that may be connected in the same branch.

With the circuit of Fig. 2 adjusted as described above, the following relations exist for the current passing through each indicating instrument, where V1 and V2 are the voltage components corresponding to the signals E1 and E2, respectively, $R=R9=R10$, and $r=R8$:

$$\text{Current through } 27 = \frac{V1}{R+(a+2)r} = K_1 V1$$

$$\text{Current through } 28 = \frac{V2}{R+(a+2)r} = K_2 V2$$

$$\text{Current through } 30 = \frac{V1+V2}{R+(a+2)r} = K_3(V1+V2)$$

$$\text{Current through } 29 = \frac{(V1-V2)r}{R^2+arR+2rR} = K_4(V1-V2)$$

In a preferred embodiment, the three resistors R5, R6 and R7 of the delta network are made equal to one another and the total resistances in the three outside branches are also adjusted to be equal to each other. In that case, the resistance of each outside branch is R while the resistors in the delta network may each have a resistance $aR$.

If the effective resistances of the two channels providing the signals E1 and E2 are known, this adjustment can be effective by substituting for the channels their effective resistances. Then, an electromotive source is connected in series with the conductors 34 and 35, the conductors 32 and 33 are connected together through a resistance equal to the effective resistance of the channel E1 and the resistors R8 and R9 are adjusted until the indicating instrument 27 reads zero. The source of E. M. F. is then interposed in series with the conductors 32 and 33 and the conductors 34 and 35 are connected together through a resistance equal to the effective resistance of the channel E2. With the resistors R8 and R9 at their previous settings, the resistance R10 is adjusted until the indicating instrument 28 reads zero. The system then is properly adjusted and if the signals E1 and E2 are supplied thereto, as shown in Fig. 2, the several indicating instruments will function in the desired manner.

With the circuits properly adjusted as described above, it will be apparent that the current in the branch of the delta network containing the resistor R5 is independent of the signal E2, while the current in the branch containing the resistance R7 is independent of the signal E1. Accordingly, the indicating instruments 27 and 28 will give readings that are proportional, respectively, to the signals E1 and E2. If desired, the indicating instruments 27 and 28 may be calibrated to read values of E1 and E2 directly.

It will be readily apparent that by adjusting the sensitivities of the indicating instruments 29 and 30, indications of any desired fraction of the difference and the sum of the two signals E1 and E2 can be obtained.

As in the case of Fig. 1, if a zero center indicating instrument is used as the indicating instrument 29, it will be possible to determine the relative magnitudes and polarities of the two input signals. If the polarities of the signals are different from those indicated by the arrows in Fig. 2, then appropriate changes in signs occur for the directions of the currents through the indicating instruments.

Figure 3:
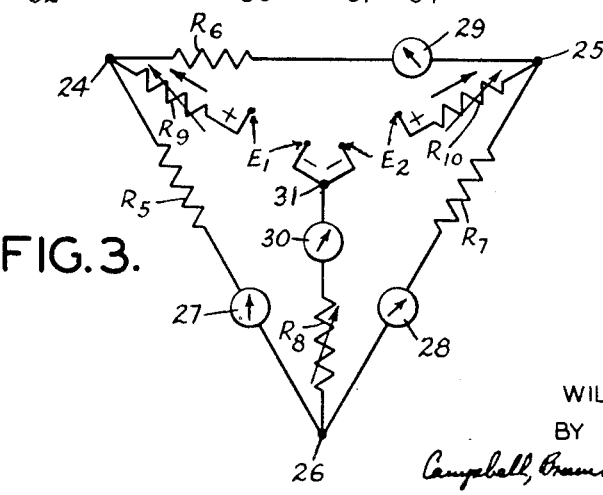
Fig. 3 is a schematic showing of the system of Fig. 2, redrawn as a delta-Y network.

The system shown in Fig. 2 can be redrawn in the form of a Y configuration of resistors connected to the respective junctions of a delta configuration of resistors, as shown in Fig. 3. When the network is considered in this form, typical conditions for balance can be outlined with relative simplicity. As stated, the desired conditions of balance obtain when the total resistance in each branch of the delta network is the same and the total resistances in each of the branches of the Y network are equal. Of course, then the total resistance in each branch of the delta network may be the same as, or any arbitrary multiple of, the total resistance in each branch of the Y network.

The networks shown in Fig. 3 will also be in balance when the ratio between one branch of the delta network to each of the other two branches is equal to the ratio of either one of the two branches of the Y network across said one branch of the delta network to the remaining branch of the Y network. Similarly, the system will be balanced if the ratio between one branch of the Y network to each of the other branches is made equal to the ratio between each of the two branches of the delta network joined to said one branch of the Y network to the remaining branch of the delta network.

From the foregoing, it will be understood that the invention provides a novel and highly effective method and apparatus for obtaining simultaneous indications of a combination such as the sum and difference, for example, of two electrical values, together with the individual magnitudes of the electrical values.

Although the illustrative embodiment described above is intended for measuring D. C. values, obviously the invention can be adapted to the measurement of A. C. values and transients with equal facility. All that is necessary is to provide compensation for reactive components in the networks in accordance with good engineering practice.

In actual practice it has been found that electrical measuring systems designed according to the invention need not be accurately in balance. On the contrary, a condition of slight unbalance can be tolerated without introducing material errors into the readings obtained.

The several representative embodiments described above are intended to be merely illustrative and not restrictive. It will be understood that those embodiments are susceptible of considerable modification within the spirit of the invention. They are not to be regarded, therefore, as restricting the scope of the appended claim.

I claim:

An electrical measuring system for obtaining indications simultaneously of the sum and difference of two electrical signals together with the individual magnitudes of said electrical signals, comprising a delta-connected resistance network, a current indicating instrument in each arm of said network, a common branch including another indicating instrument and a resistance connected to one apex of said network, a first input branch connected to a second apex of said network and to said common branch for receiving one of said electrical signals, and a second input branch connected to a third apex of said network and to said common branch for receiving the other of said electrical signals, said system being so adjusted that the current in said common branch is a function of the sum of said electrical signals, the currents in the two arms of the network connected to said common branch are functions of said electrical signals, respectively, and the current in the third arm of said network is a function of the difference between said two electrical signals.

WILBUR C. WELZ.

REFERENCES CITED

The following references are of record in the file of this patent:

UNITED STATES PATENTS

| Number | Name | Date |
| --- | --- | --- |
| 1,822,996 | Minick | Sept. 15, 1931 |
| 2,087,667 | Hedin | July 20, 1937 |
| 2,123,142 | McMaster | July 5, 1938 |
| 2,217,639 | Luhrs | Oct. 8, 1940 |
| 2,365,218 | Rodgers | Dec. 19, 1944 |